United States Patent
Chen et al.

(10) Patent No.: US 9,525,160 B2
(45) Date of Patent: Dec. 20, 2016

(54) HIGH-RATE OVERCHARGE-PROTECTION SEPARATORS FOR RECHARGEABLE LITHIUM-ION BATTERIES AND THE METHOD OF MAKING THE SAME

(71) Applicant: THE REGENTS OF THE UNIVERSITY OF CALIFORNIA, Oakland, CA (US)

(72) Inventors: Guoying Chen, Oakland, CA (US); Thomas J. Richardson, Oakland, CA (US)

(73) Assignee: The Regents of the University of California, Oakland, CA (US)

(*) Notice: Subject to any disclaimer, the term of this patent is extended or adjusted under 35 U.S.C. 154(b) by 115 days.

(21) Appl. No.: 14/400,776

(22) PCT Filed: May 14, 2013

(86) PCT No.: PCT/US2013/041004
§ 371 (c)(1),
(2) Date: Nov. 12, 2014

(87) PCT Pub. No.: WO2013/173377
PCT Pub. Date: Nov. 21, 2013

(65) Prior Publication Data
US 2015/0125733 A1 May 7, 2015

Related U.S. Application Data

(60) Provisional application No. 61/647,389, filed on May 15, 2012.

(51) Int. Cl.
*H01M 2/16* (2006.01)
*H01M 10/0525* (2010.01)

(52) U.S. Cl.
CPC ............ *H01M 2/1686* (2013.01); *H01M 2/162* (2013.01); *H01M 10/0525* (2013.01)

(58) Field of Classification Search
None
See application file for complete search history.

(56) References Cited

U.S. PATENT DOCUMENTS

2007/0264577 A1* 11/2007 Katayama ............ H01M 2/162
429/246

* cited by examiner

*Primary Examiner* — Yoshitoshi Takeuchi
(74) *Attorney, Agent, or Firm* — Lawrence Berkeley National Laboratory

(57) ABSTRACT

This invention relates to low-cost, electroactive-polymer incorporated fine-fiber composite membranes for use as overcharge and/or overdischarge protection separators in non-aqueous electrochemical cells and the methods for making such membranes.

1 Claim, 24 Drawing Sheets

HIGH-RATE OVERCHARGE-PROTECTION SEPARATORS FOR RECHARGEABLE LITHIUM-ION BATTERIES AND THE METHOD OF MAKING THE SAME

CROSS REFERENCE TO RELATED APPLICATIONS

This U.S. utility Application claims priority to PCT Application PCT/US2013/041004, filed May 14, 2013, which in turn claims priority to U.S. Provisional Application Ser. No. 61/647,389 filed May 15, 2012, which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231. The government has certain rights in this invention.

BACKGROUND OF THE INVENTION

Field of the Invention

This invention relates generally to High-Rate Overcharge-Protection Separators for Rechargeable Lithium-Ion Batteries.

Brief Description of the Related Art

With the growing demand for hybrid and electric vehicles, the estimated market for high-performance lithium-ion batteries will total more than $7 billion annually by 2015. Typical hybrid vehicles contain between 50 and 70 battery cells; plug-in electric vehicles with range-extending motors have 80 to more than 200 cells; and fully electric vehicles can carry thousands of cells. A typical lithium-ion battery cell has a transition metal oxide positive electrode and a carbon based negative electrode. An electronically insulating yet ionically conducting separator membrane is placed between the two electrodes to prevent them from touching and shorting while allowing lithium ions to pass back and forth during the charge and discharge of the battery.

Non-aqueous electrochemical cells in such arrangements suffer from safety and lifetime issues upon overcharge and/or overdischarge. The term "overcharge" is used to describe a variety of conditions, including simple charging at normal rates beyond rated capacity, overvoltage excursions for short or long periods, charging at a rate too high for one electrode (commonly the anode) without exceeding the maximum voltage, and other more complex scenarios. The damage to the overcharged cells may include electrode degradation, electrolyte breakdown, current collector corrosion, and gas evolution. Li and dissolved transition metals may plate on the anode, which can lead to the formation of internal shorts and consequently hazardous conditions. Moreover, even slight overcharging reduces the discharge capacity of a cell, which can result in over discharging, increased impedance, local heating, etc., and jeopardize the lifetime of the battery cells. As the battery industry moves towards lithium cells with higher energy density and larger packs for vehicular applications, there is paramount importance of preventing catastrophic failures and safety issues due to cell overcharge/overdischarge.

Battery packs for consumer electronics are typically overcharge-protected by external electronic controls, shutdown components, or redox shuttles. The electronics can monitor each cell and disconnect it acting in response to voltage, temperature or pressure, but they add a substantial amount of weight, cost and complexity to the battery pack. The shutdown mechanism operates by dramatically increasing the internal resistance upon the excursions of voltage, temperature or pressure, and permanently deactivates the overcharged cell. The commonly used shutdown methods involve the use of a battery separator having a central component that melts at ~160° C., an additive that produces gases, or an additive that polymerizes to form insulating compounds. In a multi-cell stack capable of delivering several hundred volts, permanently shutting down a cell reduces the usable capacity of the stack and puts added strain on the remaining cells in parallel with it. Other approaches, like system over sizing or complex re-routing of current around overcharged cells, are also impractical in these stacks due to cost and weight issues.

Reversible internal protection mechanisms that maintain a cell's potential and discharge capacity can provide protection without the above-mentioned disadvantages. Redox shuttles are able to balance the cells in the string and allow for continuous operation in the event of overcharge, but their reliance on molecular and cationic diffusion in the electrolyte limits the sustainable current density and cell charging rate. This approach also fails to work at low temperatures that are commonly experienced by vehicles. The most promising method is to use a self-actuated component that acts as a reversible electrochemical switch regulated by cell voltage. In the event of overcharge and/or overdischarge, the component creates a current bypath to protect the cell against catastrophic failure. Unlike the redox shuttle method, it conducts overcharge current through an electronic rather than a diffusion path, and therefore is capable of high-rate and low-temperature protections. The concept was first disclosed in U.S. Pat. No. 6,228,516 (May 2001), and later experimentally demonstrated in our work in Chen et. al., Electrochemical and Solid State Letters, 2004, 7(2), A23-26, the contents of which are herein incorporated by reference in its entirety. In our initial studies, a commercial micro porous separator was impregnated with poly (3-butylthiophene) also known as P3BT, an electrochemically active polymer that becomes electronically conducting when oxidized at 3.2 V. The composite membrane was introduced into a TiS2-Li cell in place of the regular micro porous separator, which transformed the battery into a resistor at the triggering voltage and limited the charging potential at 3.2 V to prevent the cell from overcharge damage.

In further detail, a self-switching bypass structure for a Li-ion cell was made by coating a voltage activated conductive polymer (VACP), poly(3-butylthiophene) (P3BT), onto a conventional micro-porous polyethylene separator. By this method, the VACP is dissolved in a solvent such as chloroform to form a low viscosity solution. The solution is coated on both sides of a commercial polyethylene (PE) or polypropylene (PP) micro-porous separator (Celgard 2500). The solution flows into and through the preexisting pores of the polyolefin separator. When the chloroform evaporates it leaves behind a film of VACP on the surface of the separator and a network of solid VACP that has penetrated the existing pores of the separator to connect the two, coated faces of the separator. The use and effect of the VACP coated separator is similar to a standard external electronic bypass circuit though potentially less expensive and more responsive to overcharge conditions. A Li-ion cell was made using a standard $LiMn_2O_4$ cathode and carbon anode laminates with the VACP coated separator sandwiched in between. The VACP coated separator became electrically conductive to generate a short between the anode and cathode electrodes when the cell voltage exceeded the conductive onset voltage of the VACP material, in this case approximately 3.4 V. Thus the cell could not be charged beyond this point, preventing cell overcharge or potentially allowing for cell balancing in strings of cells. In this initial work, the maximum bypass current achieved was approximately 0.2 mA/cm$^2$, above which the cell voltage would continue to rise. On issue related to this particular method is that the coating process results in the bulk of the VACP being present on the surface of the two faces of the separator film where it contributes very little to the current bypass capability of the separator. Because VACP materials are typically more expensive than the materials used to make the separator, it is preferred that the amount of the VACP material be minimized.

Substantial DOE financial support was obtained in further developing this technology, including an SBIR collaboration with Farasis Energy, Inc. In August 2011, Farasis Energy Inc. filed a patent (U.S. Pat. No. 7,989,103) disclosing methods of making micro porous separators incorporating a voltage activated conductive polymer.

A number of issues remain in the current state-of-the-art overcharge-protection separators. The micro porous composite separators typically have lower porosity compared to the conventional ones, which leads to higher cell impedance and lower power density. Non-uniform distribution of the electroactive polymer in the composite membrane can also lead to low utilization, high internal resistance, localized heat generation and instability. Moreover, high loading of the relatively expensive electroactive polymer and processing complexity largely limit the scale-up options and consequently industrial adaptation of the technology.

An alternative to the state-of-the-art commercial micro porous separators are porous non-conducting fine-fiber separators as disclosed by DuPont in U.S. Pat. No. 7,112,389 (September 2006) the contents of which are herein incorporated by reference in its entirety. Owning to its unique pore structure and large porosity, the membranes can provide electronic and dendritic barriers in secondary lithium-ion batteries with reduced thickness and lower ionic resistance, which enables faster charge and discharge for increased power density. Low cost and scalable fiber spinning methods are available to assemble fibrous polymer mats composed of fiber diameters ranging from several microns down to lower than 50 nm. This type of non-conducting fiber membrane is promising as the next generation separators for rechargeable batteries.

Notwithstanding these results, there still remains a need for electroactive conducting fiber membranes for use as high-rate overcharge-protection separators for rechargeable lithium-ion batteries.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Various embodiments are illustrated in the context of high-rate overcharge-protection separators for rechargeable lithium-ion batteries. The skilled artisan will readily appreciate, however, that the materials and methods disclosed herein will have application to a number of variants.

This invention relates to low-cost, electroactive-polymer incorporated fine-fiber composite membranes for use as overcharge and/or overdischarge protection separators in non-aqueous electrochemical cells and the methods for making such membranes. Particularly, the use of porous fiber-based membrane separators enables high rate charge and discharge in normal cell operation. Upon overcharge and/or overdischarge, the electroactive polymer in the membrane is self-activated by the voltage, which creates a reversible shunt to bypass the current and thereby prevent damage and catastrophic failure at the cell level. The threshold voltage can be tuned by the selection of electroactive polymers to suit different battery chemistries.

Various embodiments of the invention describe a technology related to porous fine-fiber based, electroactive-polymer composite membranes that can provide low-cost and high-rate overcharge and/or overdischarge protection for non-aqueous electrochemical cells and the methods for making the same. Particularly, the composite fiber membrane provides electronic insulation and high ionic conduction during normal cell operation. In the event of overcharge and/or overdischarge, the membrane provides a reversible, self-actuated current shunt to prevent damage at both the battery cell and pack levels. Batteries incorporating such membranes can be expected to have higher rate capability, improved safety, and a longer cycle life.

Figure 1:
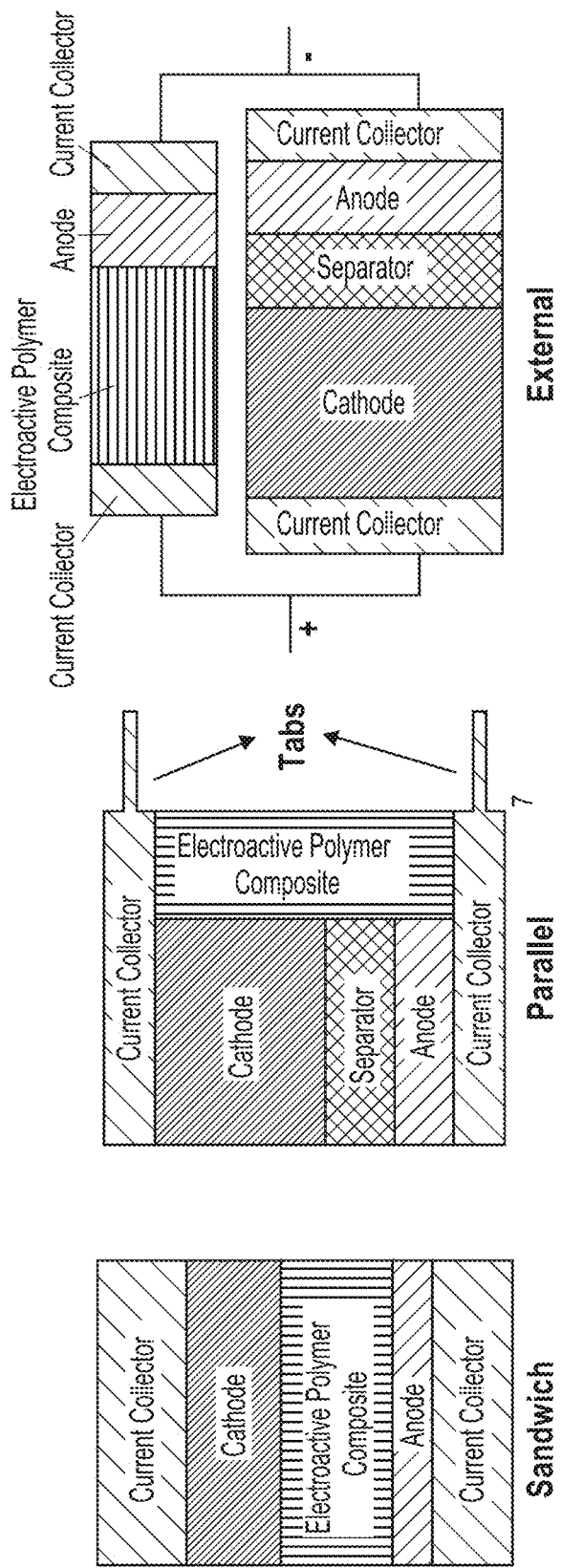
FIG. 1 illustrates the versatility of the electroactive conductive polymer approach for three different cell configurations.

FIG. 1 illustrates the versatility of the electroactive conductive polymer approach for three different cell configurations. In the "sandwich" configuration, the electroactive polymer composite is used as a separator for a rechargeable lithium-ion battery cell wherein composite is in direct contact with the positive electrode (cathode) on one side and the negative electrode (anode) on the other. In the "parallel" configuration, the electroactive polymer composite is not used as a separator but is placed in parallel between the cathode/current collector and anode/current collector. In the "external" configuration, the electroactive polymer composite is placed in series between current collector and anode/current collector. The "external" configuration allows for a protection circuit independent of the battery environment wherein the electrolyte need not be in-flammable and the anode can be a material other than lithium.

In one embodiment, the composite fiber separator is composed of an inert matrix of non-conductive fibers and a matrix of electroactive conductive polymer fibers. The inert matrix phase may comprise at least one of polyolefins, polypropylenes and their copolymers, polyacrylonitriles, polysulfones, polycarbonates, poly(vinylidene difluoride), poly(methacrylate), poly(methylmethacrylate), poly(ethylene oxide), and glass fibers. The electroactive conductive polymer fibers may comprise at least one of substituted and unsubstituted polypyrrole, polyaniline, polyacetylenes, polythiophenes and their copolymers, polyfluorenes and their copolymers, polyphenylenes and their copolymers. The substituents may include alkyl, aromatic, or halogen groups.

In one embodiment, composite fiber membranes are made by solution or melt impregnating an electroactive polymer into a premade fiber membrane substrate that serves as the inert matrix.

In one embodiment, the composite fiber separator includes two components comprising electroactive conductive polymer fibers and an inert matrix of non-conductive fibers.

In one embodiment, the composite fiber separator is a bilayer and includes two components: one component with high-voltage electroactive conductive polymer fibers and an inert matrix of non-conductive fibers, and the other component with low-voltage electroactive conductive polymer fibers and an inert matrix of non-conductive fibers. The two components are positioned adjacent to each other but may not necessarily be mixed. Alternatively, the two components may be mixed.

In one embodiment, the composite fiber separators are prepared by fiber spinning techniques, including electrospinning, wet spinning, dry spinning, melt spinning, and gel spinning.

In one embodiment, electrospinning is used to make composite fiber membranes. An aqueous or non-aqueous solution containing a mixture of the matrix phase and an electroactive polymer is used to create continuous polymer filaments that are deposited onto a substrate as a web. The substrate may be directly used as the current collector in the battery cells. Electro-blown spinning is described in DuPont in U.S. Pat. No. 7,112,389 (September 2006), and in International Publication Number WO 03/080905 A1 entitled "A Manufacturing Device and the Method of Preparing for the Nanofibers Via Electro-Blown Spinning Process" the contents of both documents are herein incorporated by reference in their entirety.

In another embodiment, electrospinning is used to make the composite fiber membrane with a high-voltage electroactive polymer and an inert matrix on one side and a low-voltage electroactive polymer and an inert matrix on the other side. An aqueous or non-aqueous solution containing a mixture of the matrix phase and a high-voltage electroactive polymer is electrospinned to produce the mat. After solvent evaporation, another aqueous or non-aqueous solution containing a mixture of the matrix phase and a low-voltage electroactive polymer is then further electrospinned onto the top of the high-voltage polymer mat to make the composite.

In one embodiment, the composite fiber membrane is used as a separator for a rechargeable lithium-ion battery cell wherein the composite is in direct contact with the positive electrode on one side and the negative electrode on the other.

In another embodiment, two composite membranes are used together as a bilayer separator to expand the voltage window for normal cell operation. A high-voltage polymer is incorporated in an inert matrix and placed adjacent to the positive electrode, while a low-voltage polymer is incorporated in an inert matrix and placed adjacent to the negative electrode.

In one embodiment, a two-sided composite membrane made by electrospinning is used as an overcharge-protection separator for a lithium battery cell, with the side containing the high-voltage polymer facing the positive electrode and the side with the low-voltage polymer facing the negative electrode.

In one embodiment, the composite fiber membrane is placed in parallel to the electrode assemble in the battery cell. The electrode assemble includes a positive electrode, a separator and a negative electrode. The composite membrane is sandwiched between the positive and negative current collectors, placed adjacent to the electrode assembly but not between the electrodes.

In another embodiment, the composite fiber membrane is placed in a cell between a current collector and a negative electrode. This cell is then externally connected in parallel to a battery cell containing a positive electrode, a separator and a negative electrode.

Figure 2:
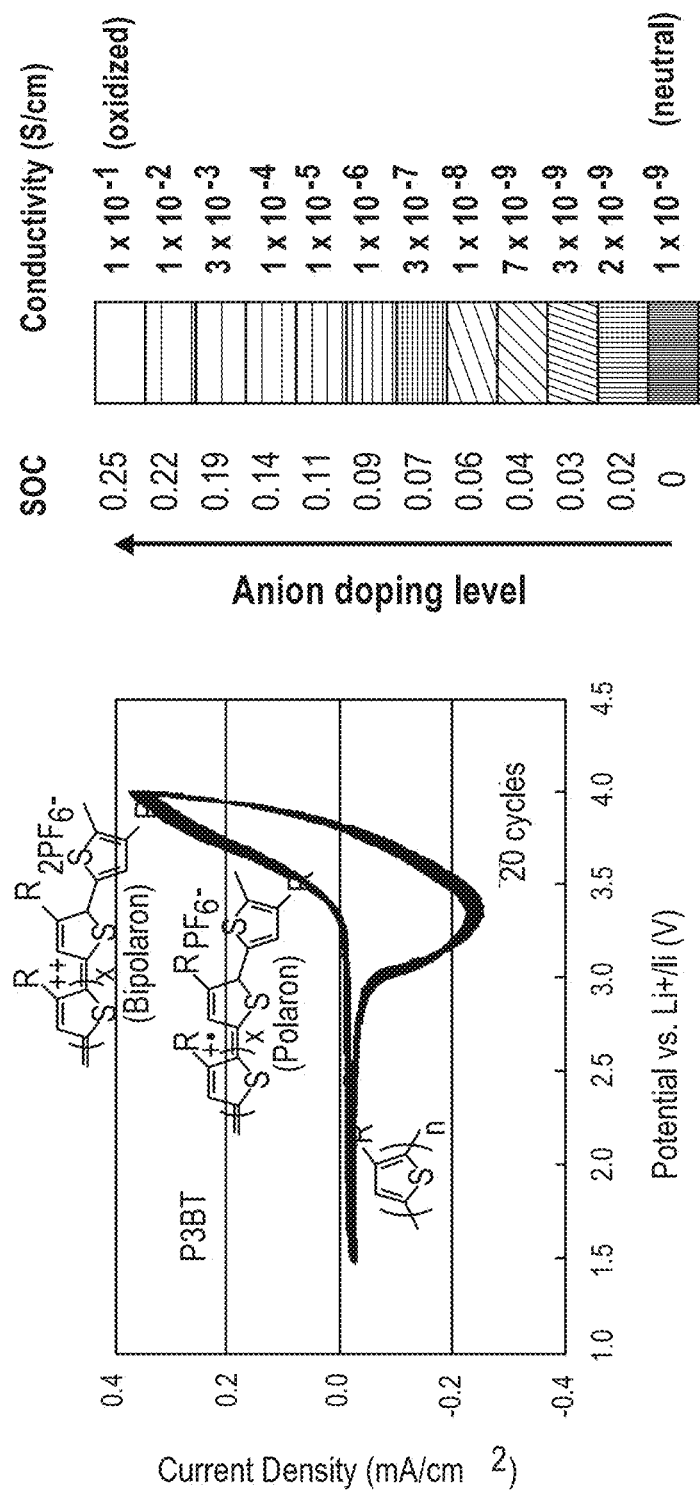
FIG. 2 illustrates a graph of current density versus voltage along with a corresponding depiction of the conductivity, state of charge (SOC), and oxidation state of a conducting polymer poly(3-butylthiophene) (P3BT).

To gain a better understanding of the electroactive characteristics of conducting polymer fibers, the various oxidation states of poly(3-butylthiophene) (P3BT) were further investigated. FIG. 2 illustrates a graph current density versus voltage along with a corresponding depiction of the conductivity, state of charge (SOC), and oxidation state of a conducting polymer P3BT. The cell voltage regulates the resistivity of the conduciting polymer P3BT. The P3BT is in an un-oxidized (neutral) state during normal cell operation from approximately 1.5 to 3.2 volts and depicted with a SOC of zero (0) and conductivity of $1\times10^{-9}$ S/cm. Visually, the un-oxidized P3BT (0 SOC, $1\times10^{-9}$ S/cm) has a bright red appearance that transitions towards a dark blue appearance as the P3BT oxidizes (0.25 SOC, $1\times10^{-1}$ S/cm). As the cell voltage increases the P3BT begins to oxidize above 3.3 volts and the SOC increases along with the conductivity. Also depicted are the Polaron radical species resulting from the removal of a single electron and the Bipolaron radical species resulting from the removal of a second electron during the progressive oxidation process.

P3BT has demonstrated a relatively high oxidation potential and is a good candidate for use as a single polymer overcharge protection mechanism incorporated into separators for lithium ion battery cells which utilize a medium-high energy cathode material/configuration.

In one embodiment, Poly[(9,9-dioctylfluorenyl-2,7-diyl)] (PFO) was utilized as a single electroactive polymer in a separator because PFO demonstrates a high oxidation potential and is a promising candidate for high energy cathode applications. However, the PFO in a single polymer separator has shown a tendency to become unstable at the anode potential during cycling.

In one embodiment, a PFO/P3BT bilayer has been incorporated as a separator to make use of the positive qualities of both electroactive polymers while negating the deficiency of PFO. Thus, the P3BT has demonstrated it's usefulness in high energy cathode applications when incorporated into a bi-layer configuration with PFO (contacting the cathode) because of P3BT's stable operation at the anode potential.

Figure 3:
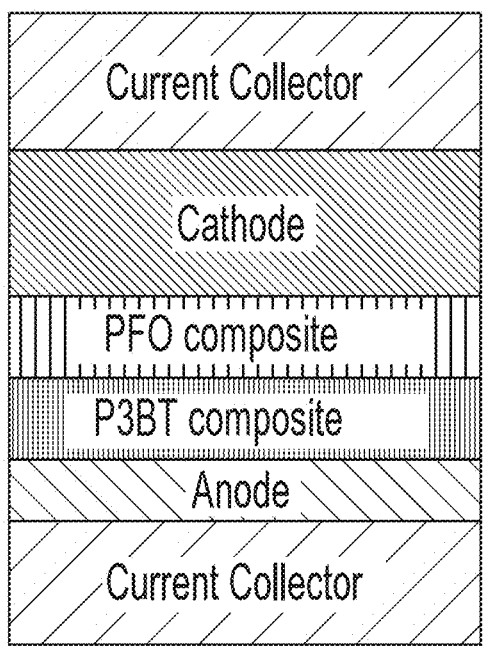
FIG. 3 illustrates a poly[(9,9-dioctylfluorenyl-2,7-diyl)] (PFO) fiber composite placed adjacent to a cathode and the poly(3-butylthiophene) (P3BT) fiber composite placed adjacent to an anode.
Figure 4:
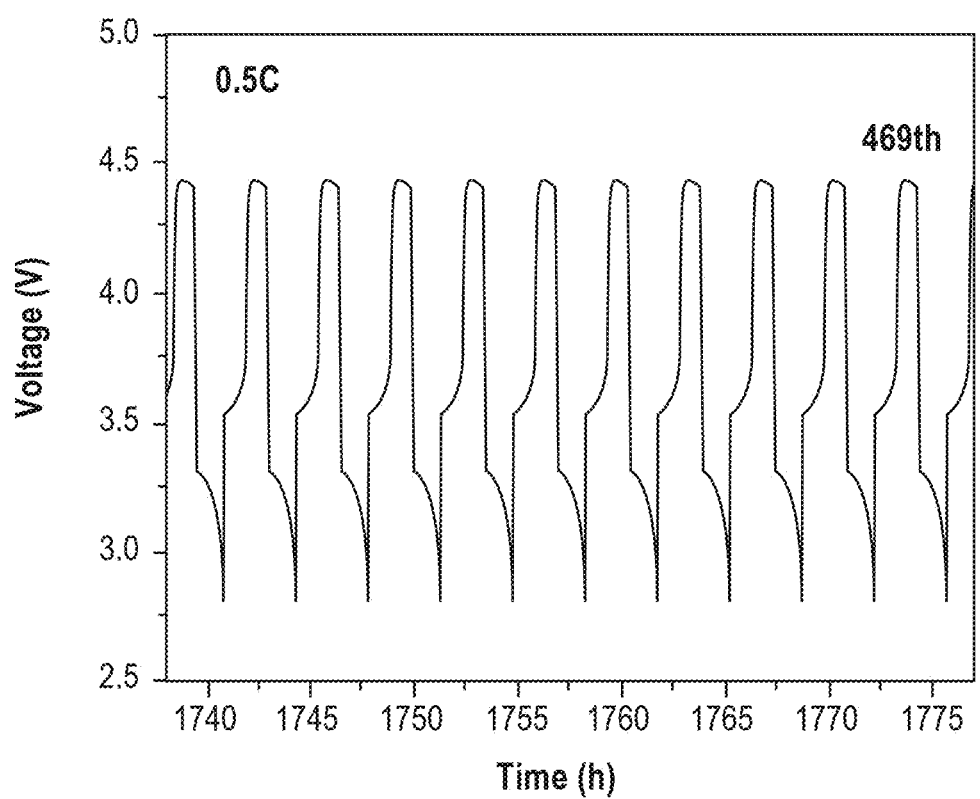
FIG. 4 illustrates long-term reversible protection with hundreds of cycles.
Figure 5:
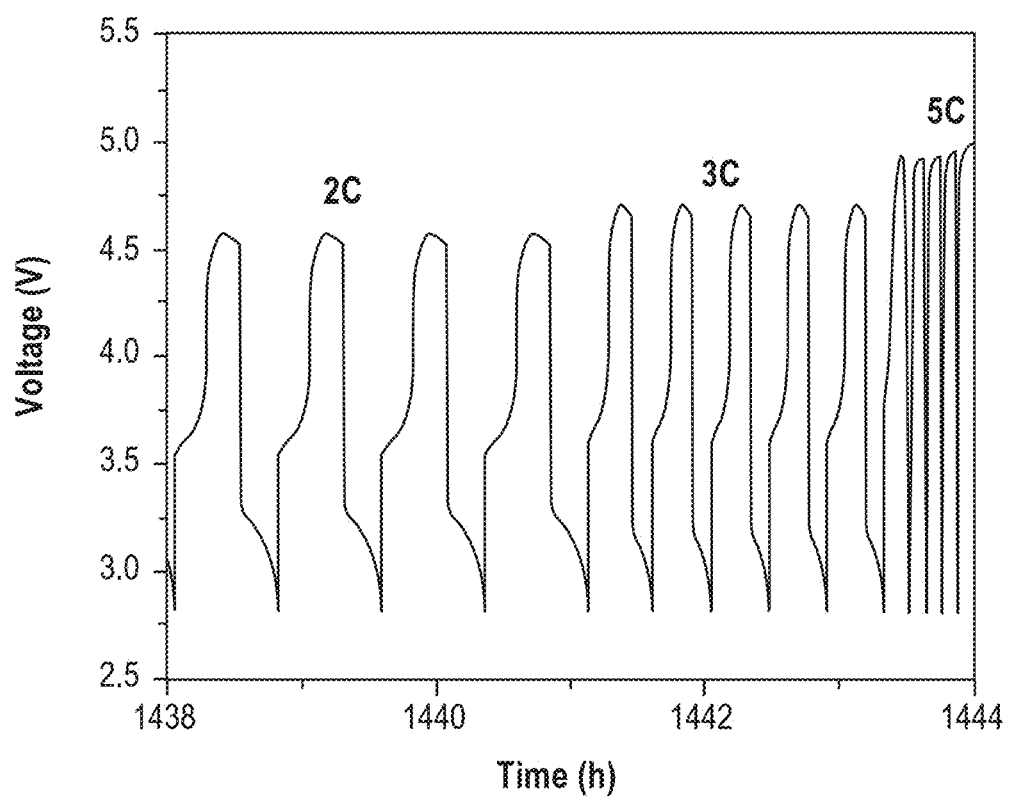
FIG. 5 illustrates that steady state potential increases with the charging rate, and reaches and maintains a voltage 4.8 V at a high charging rate of 5C.

In one embodiment, poly[(9,9-dioctylfluorenyl-2,7-diyl)] (PFO) and poly(3-butylthiophene) (P3BT) are solution impregnated into non-conductive commercial fiber membranes to make the porous composite membranes. The membranes are then used as a bilayer overcharge-protection separator in a "Swagelok-type" cell with LiFePO4 as a cathode and Li foil as the anode and reference electrode. FIG. 3 illustrates that the PFO fiber composite is placed adjacent to the cathode and the P3BT fiber composite adjacent to the anode. FIG. 4 illustrates that long-term reversible protection with hundreds of cycles is achieved. FIG. 5 illustrates that the steady state potential increases with the charging rate and reaches and maintains a voltage 4.8 V at a high charging rate of 5C.

Investigation of a New Electroactive Conductive Polymer PFOP

Figure 6:
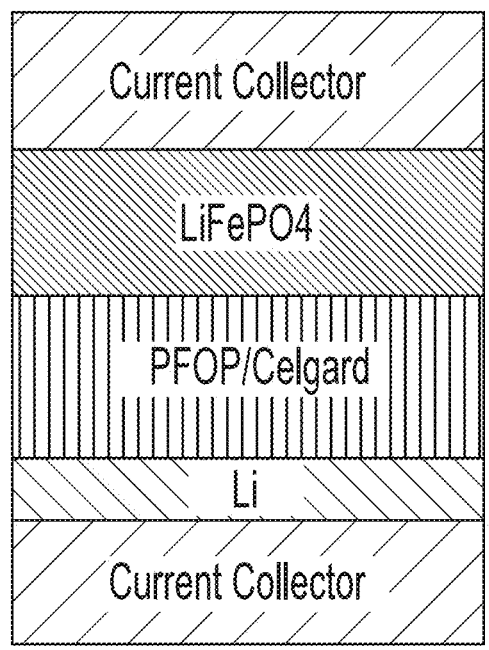
FIG. 6 illustrates a Li ion battery configuration utilizing Poly[(9,9-dioctylfluorenyl-2,7-diyl)-co-(1,4-phenylene)] (PFOP) as a single-polymer overcharge protection separator.
Figure 7:
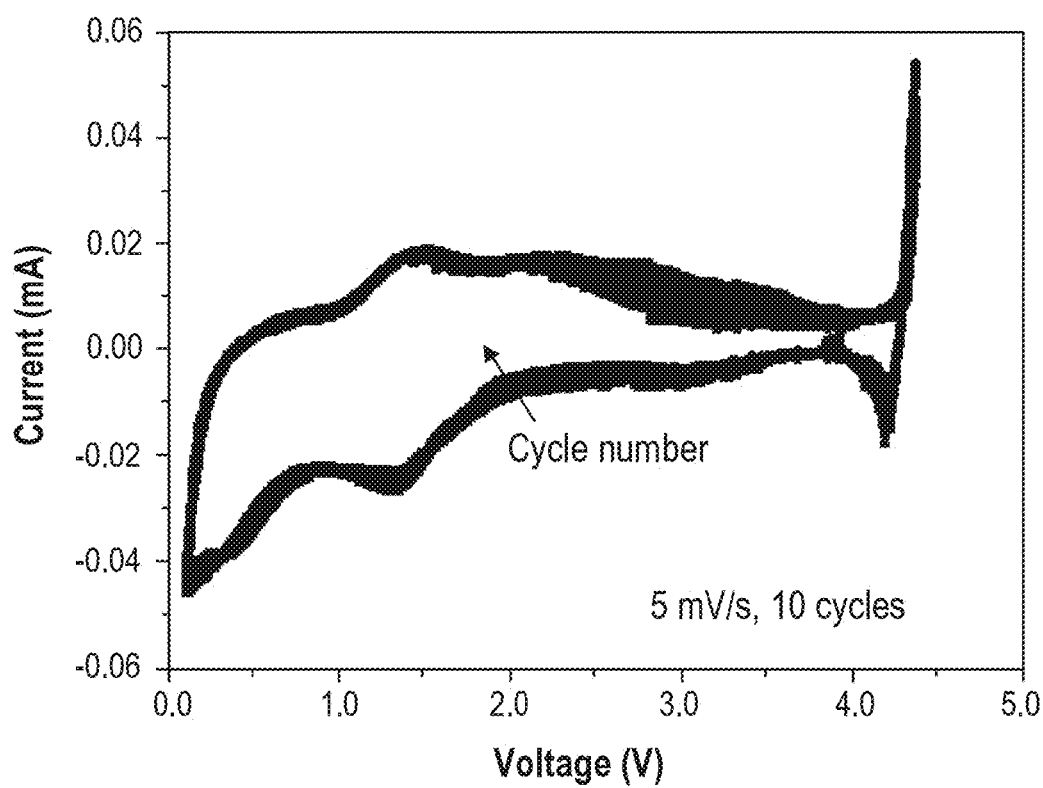
FIG. 7 illustrates the C-V curve for PFOP.
Figure 8:
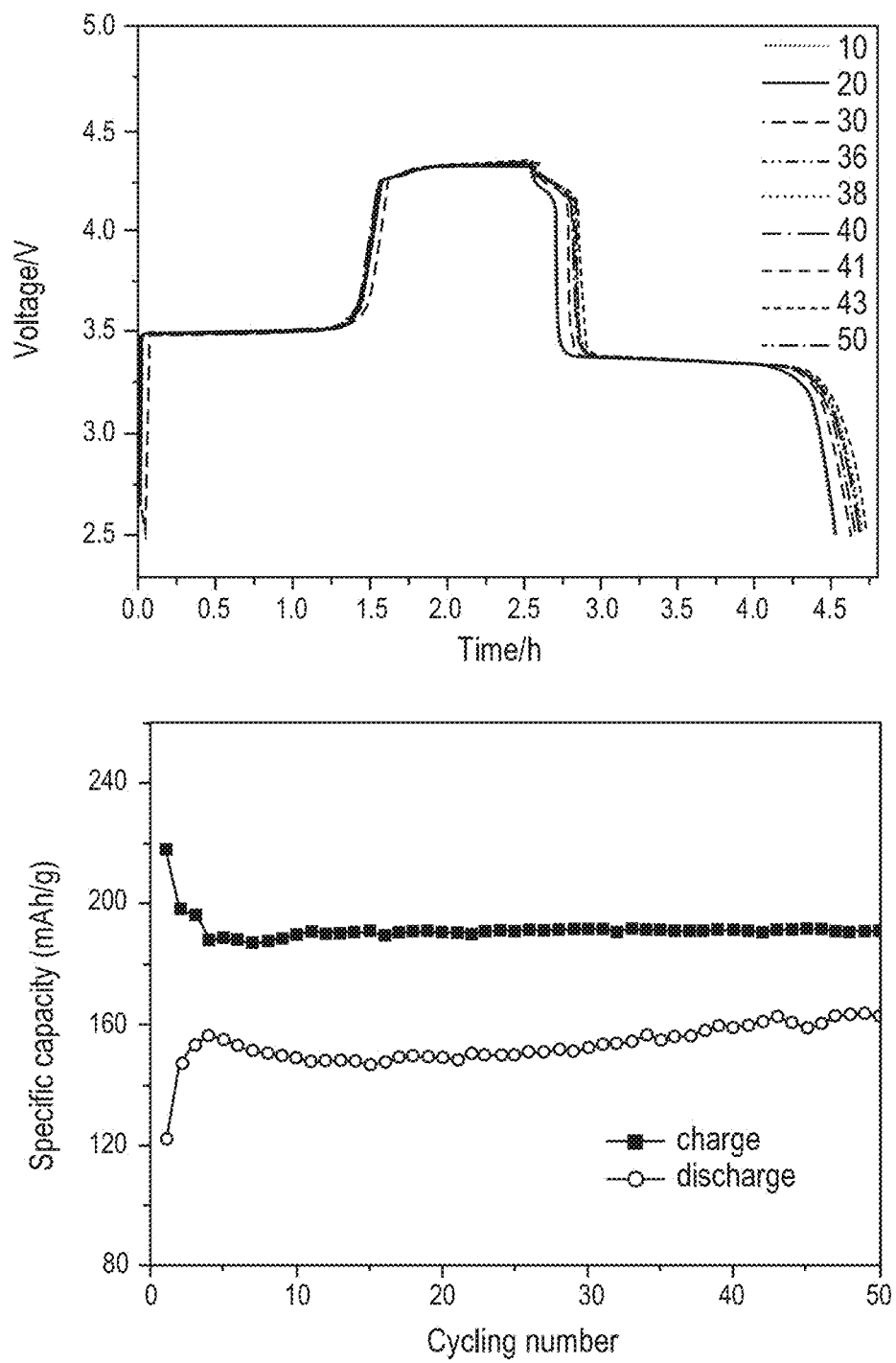
FIG. 8 illustrates additional performance data for a PFOP cell.

Poly[(9,9-dioctylfluorenyl-2,7-diyl)-co-(1,4-phenylene)] (PFOP) was found to have an extended stability window in lithium battery electrolytes. FIG. 6 illustrates a Li ion battery (LiFePO$_4$ cathode) configuration utilizing PFOP as a single-polymer overcharge protection separator. The PFOP was solution impregnated into a Celgard porous separator. The PFOP was dissolved into a solvent and the Celgard was then soaked in the solvent/PFOP solution. PFOPs ability to provide a single-polymer overcharge protection was demonstrated. FIG. 7 illustrates the C-V curve for PFOP. PFOP has the highest onset oxidation voltage (4.25V) among the investigated electroactive polymers. PFOP has shown improved low-voltage stability at the anode of a cell as well. FIG. 8 illustrates additional performance data for a PFOP cell. The PFOP cell was cycled at 0.5C and 40% overcharge. The improved low-voltage stability allows for stable single-polymer protection. Improved discharge capacity upon cycling may be a result of enhanced conduction in the electrode.

Electroactive Polymers Solution Impregnated into Commercial Non-Conductive Fiber Membranes to Make the Porous Composite Membranes Previous embodiments have demonstrated the feasibility of solution impregnating electroactive polymers into the pores of commercial separator material such as Celgard. As discussed above, the drawbacks of solution impregnating porous separators are 1) non-uniform distribution of the electroactive polymer in the composite membrane leads to low utilization, 2) high internal resistance, and 3) localized heat generation and instability. Thus, additional embodiments build upon the initial concept by solution impregnating electroactive polymers into/onto commercial fiber membranes to make improved porous composite membranes. The large porosity and open pore structure in, for example, glass fiber membrane composites leads to a more uniform conductive polymer distribution within the glass fiber composite.

Figure 9:
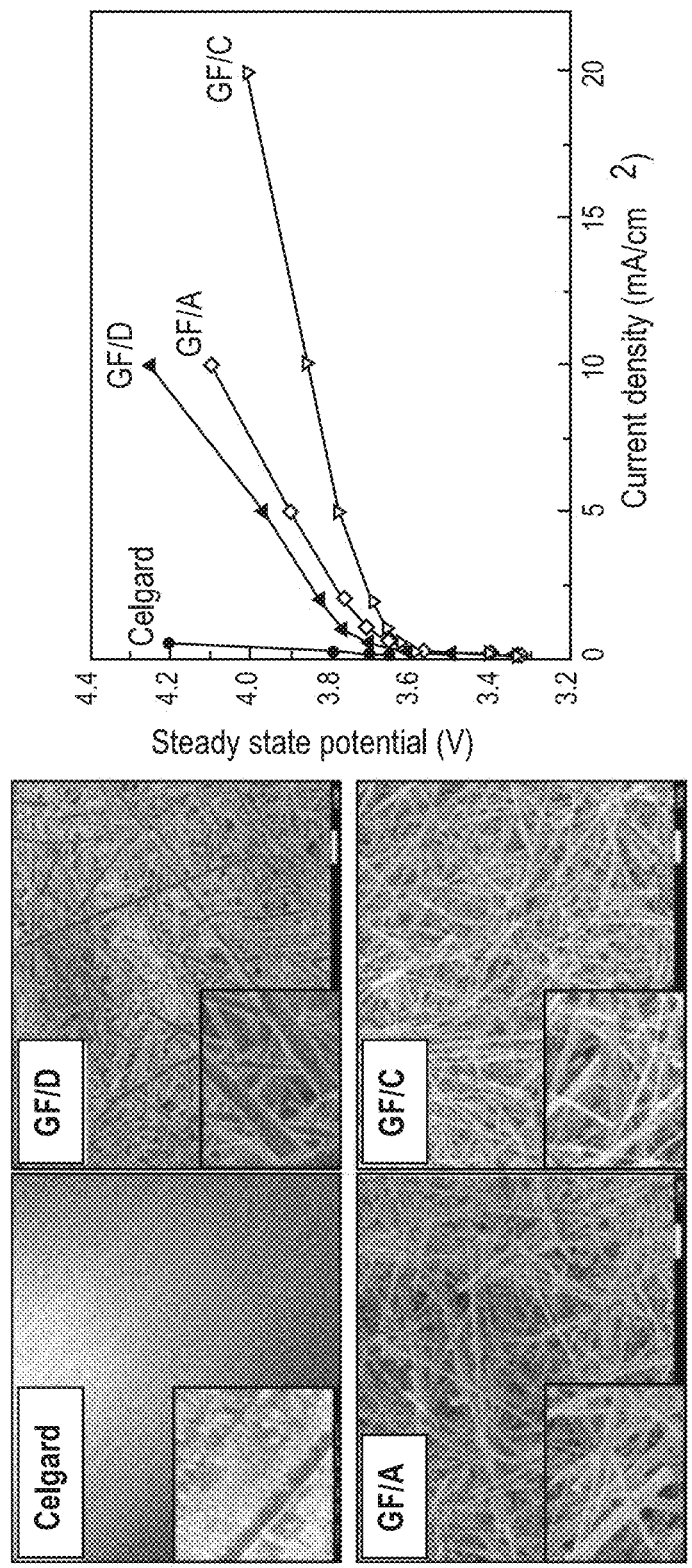
FIG. 9 illustrates a comparision of the steady state potential (V) versus current density (mA/cm$^2$) for Celgard 2500 and three types of glass fibers GF/A, GF/B, GF/C, all solution impregnated with P3BT.
Figure 10:
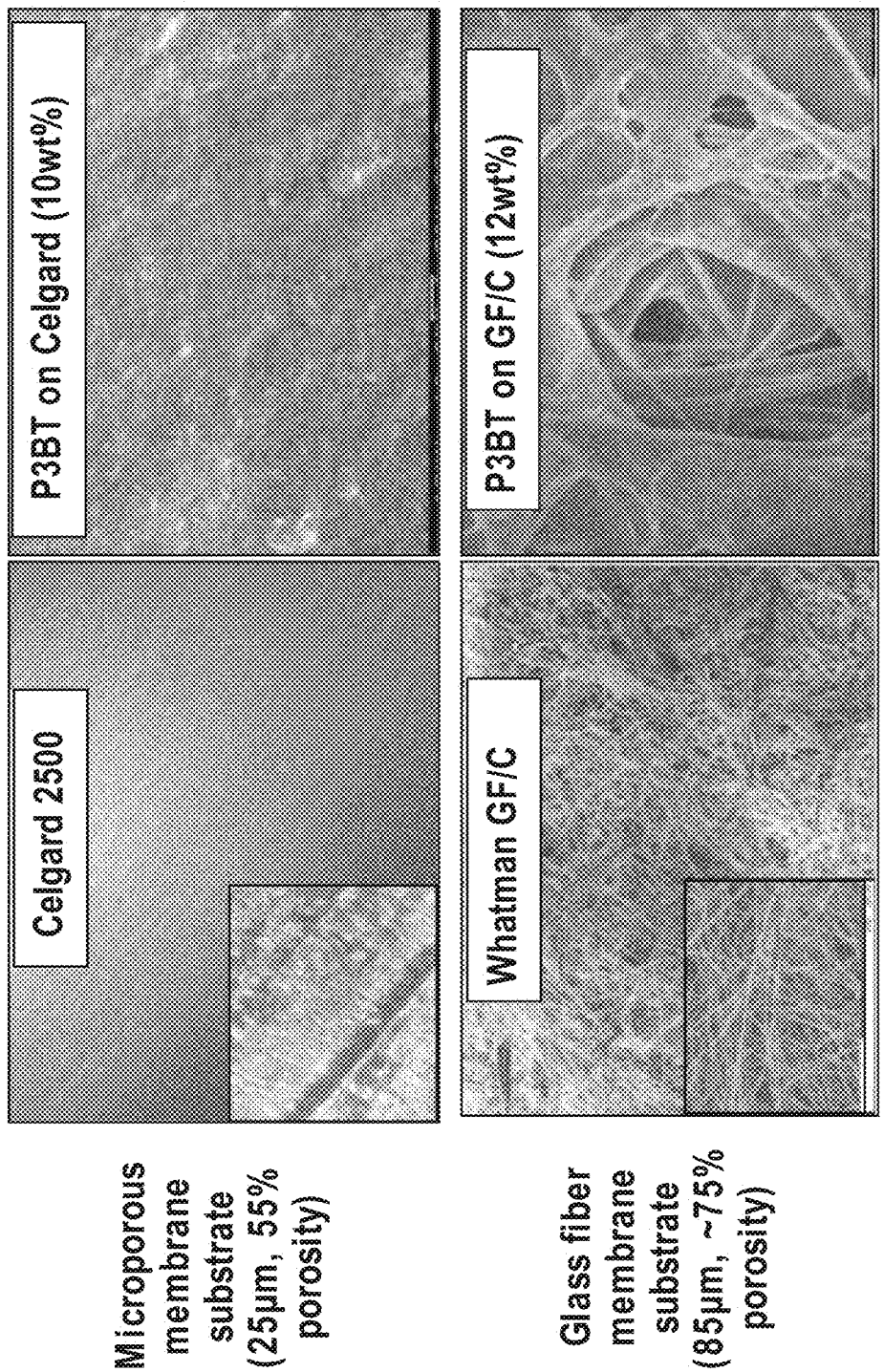
FIG. 10 illustrates the Celgard 2500 microporous substrate has approximately 25 μm, 55% porosity whereas the glass fiber membrane substrate GF/C has approximately 85 μm, 75% porosity.

FIG. 9 illustrates a comparision of the steady state potential (V) versus current density (mA/cm$^2$) for Celgard 2500 and three types of glass fibers GF/A, GF/B, GF/C, all solution impregnated with P3BT. As scene, for a given voltage, the highest current density is found in glass fiber composite membranes containing GF/C. Referring to FIG. 10, the Celgard 2500 microporous substrate has approximately 25 μm, 55% porosity whereas the glass fiber membrane substrate GF/C has approximately 85 μm, 75% porosity. The smaller fiber diameter and higher surface area in the GF/C fiber membrane lead to improved performance in the composite. Overall, the large porosity and open pore structure in the glass fiber membranes promote more uniform polymer distribution and reduced surface deposits.

Figure 11:
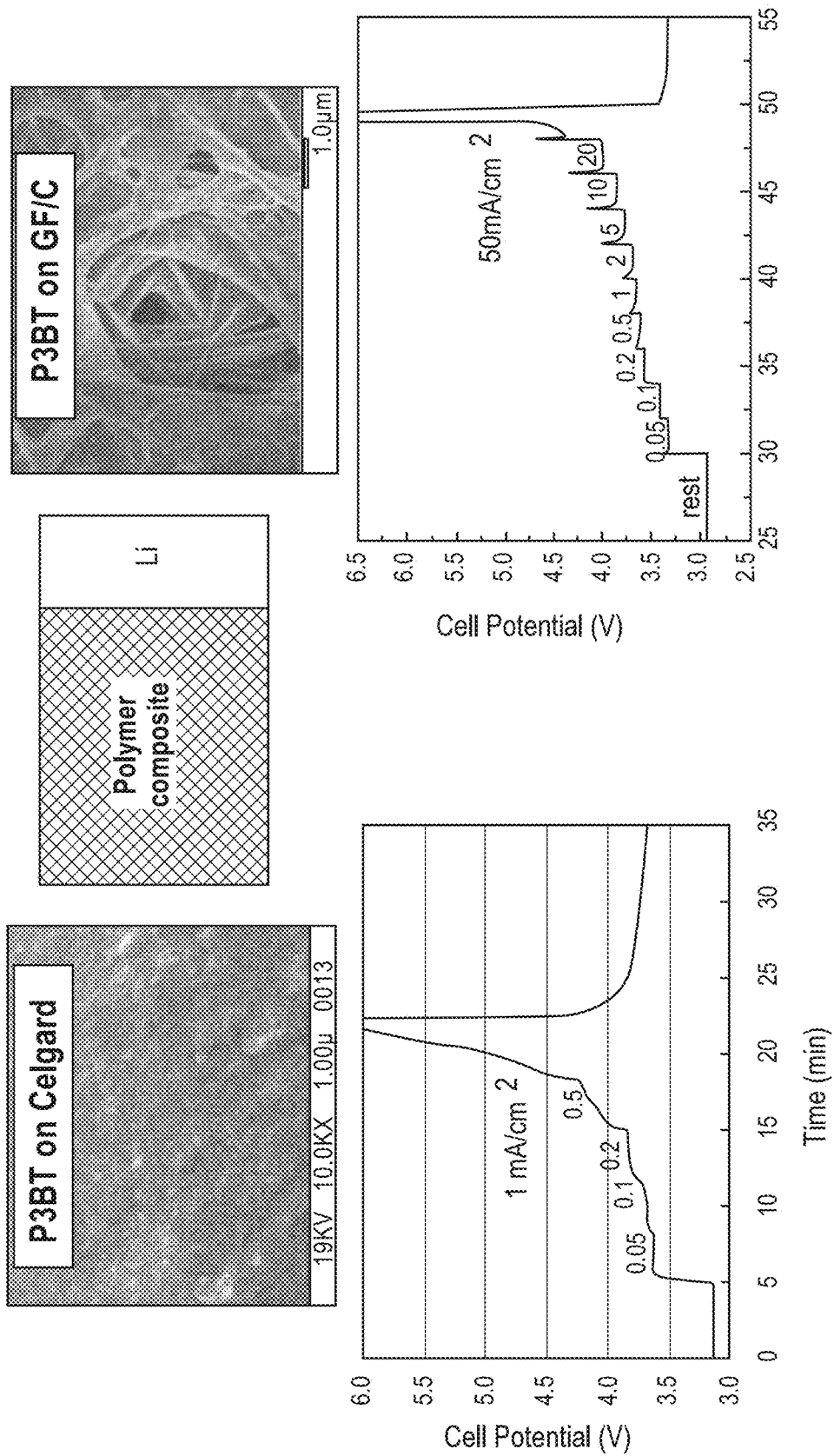
FIG. 11 illustrates a comparision of the cell potential (V) versus time (min) while increasing the current for Celgard 2500 and GF/C.

FIG. 11 illustrates a comparison of the cell potential (V) versus time (min) while increasing the current for Celgard 2500/P3BT and GF/C and P3BT. The improved polymer distribution and utilization in the fiber membrane composite GF/C and P3BT led to a 40-fold increase in sustainable current (20 mA/cm$^2$) in GF/C and P3BT compared to Celgard and P3BT (0.5 mA/cm$^2$).

Figure 12:
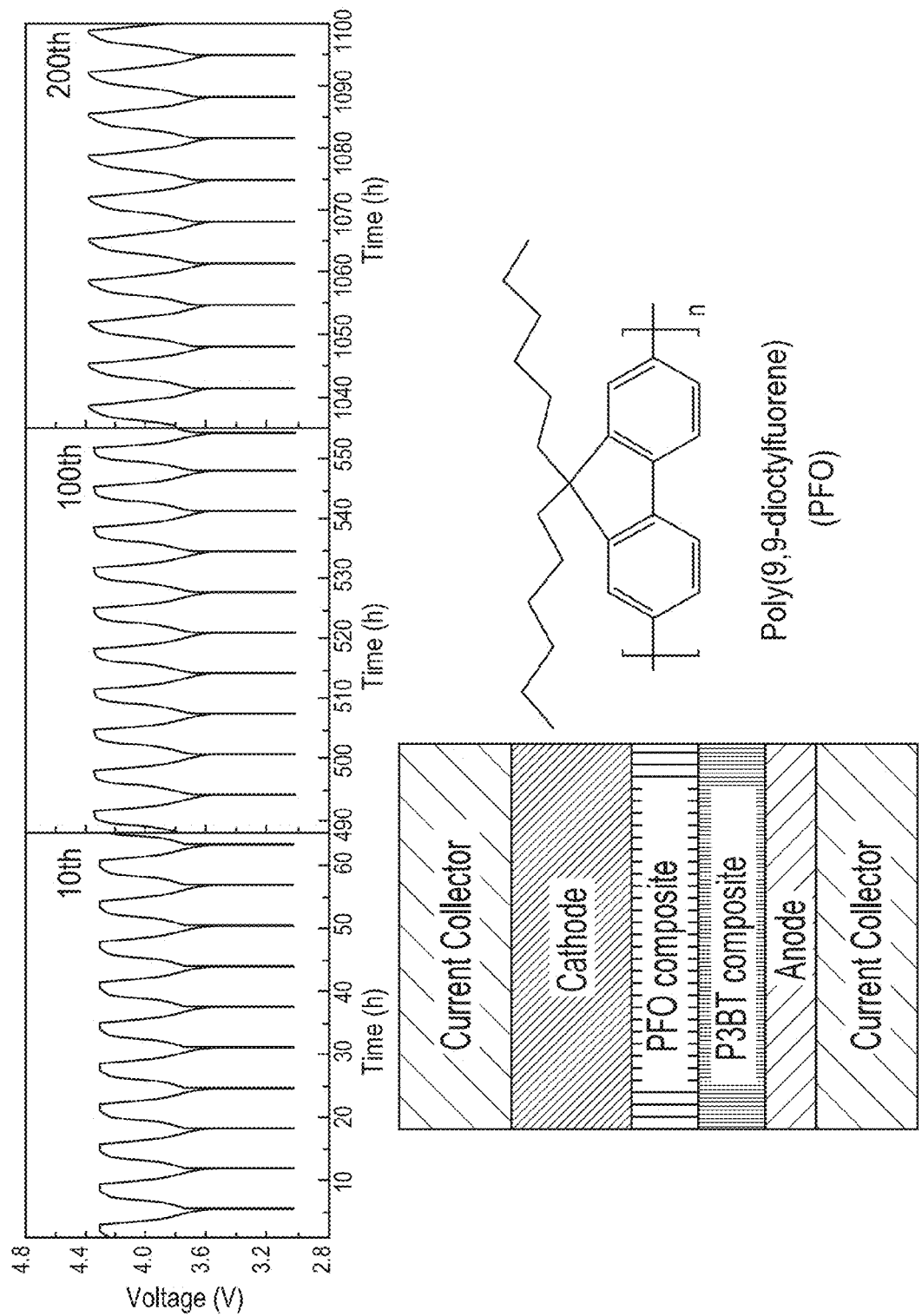
FIG. 12 illustrates a PFO composite/P3BT composite bilayer separator in a Li-ion cell along with cycling data. Improved protection in LiNi$_{1/3}$Co$_{1/3}$Mn$_{1/3}$O$_2$ cell

FIG. 12 illustrates a PFO/glass fiber composite and P3BT/glass fiber composite bilayer separator in a Li-ion cell along with cycling data. Protection in a LiNi$_{1/3}$Co$_{1/3}$Mn$_{1/3}$O$_2$ (Gen 3) cell drastically improved from the previous microporous composites. The cell cycled at 0.5C and 60% overcharge for more than 200 cycles. Upper limiting voltage increased from 4.35 to 4.4 V. Some instability suggests some polymer distribution issues remain in the glass fiber composites.

Figure 13:
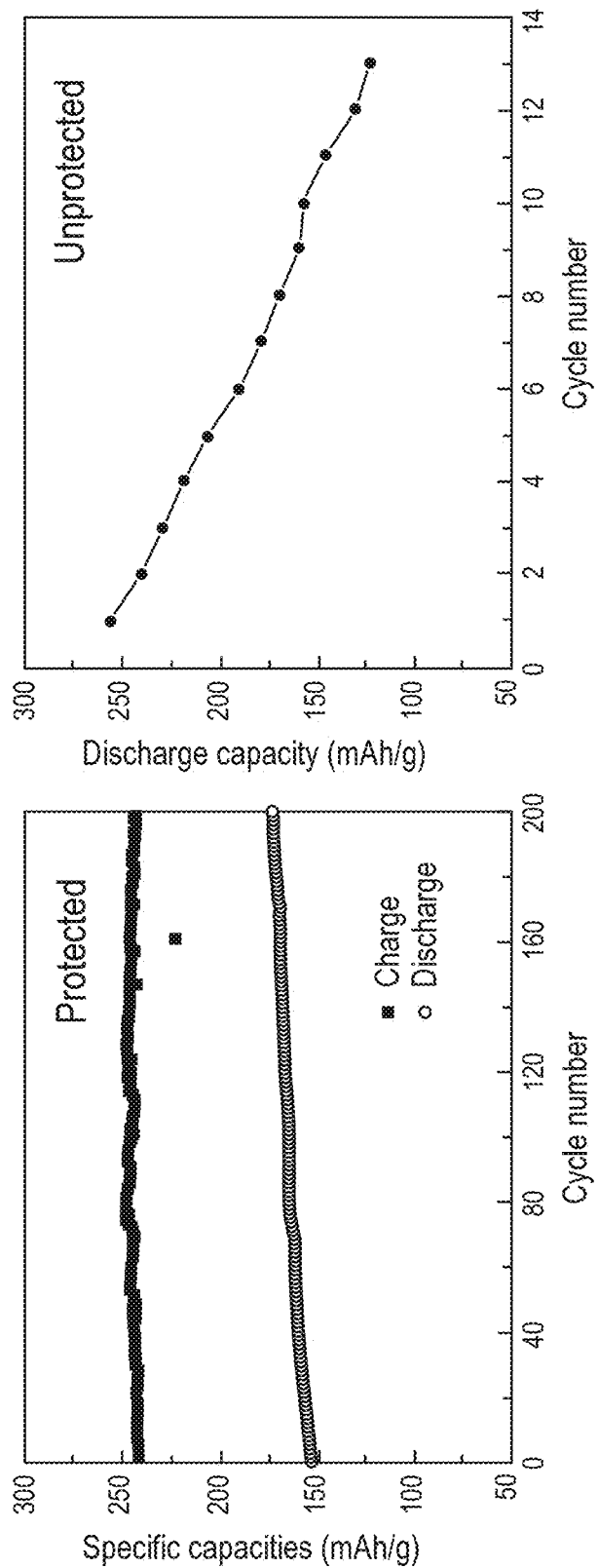
FIG. 13 illustrates graphs for specific capacity (protected) and discharge capacity (unprotected).

FIG. 13 illustrates graphs for specific capacity (protected) and discharge capacity (unprotected) for the previously discussed PFO/P3BT composite LiNi$_{1/3}$Co$_{1/3}$Mn$_{1/3}$O$_2$ (Gen 3) cell. An increase in the upper limiting voltage leads to a slight increase in discharge capacity in the protected cell. In comparison, the discharge capacity in the unprotected cell rapidly decreased upon overcharge abuse.

Figure 14:
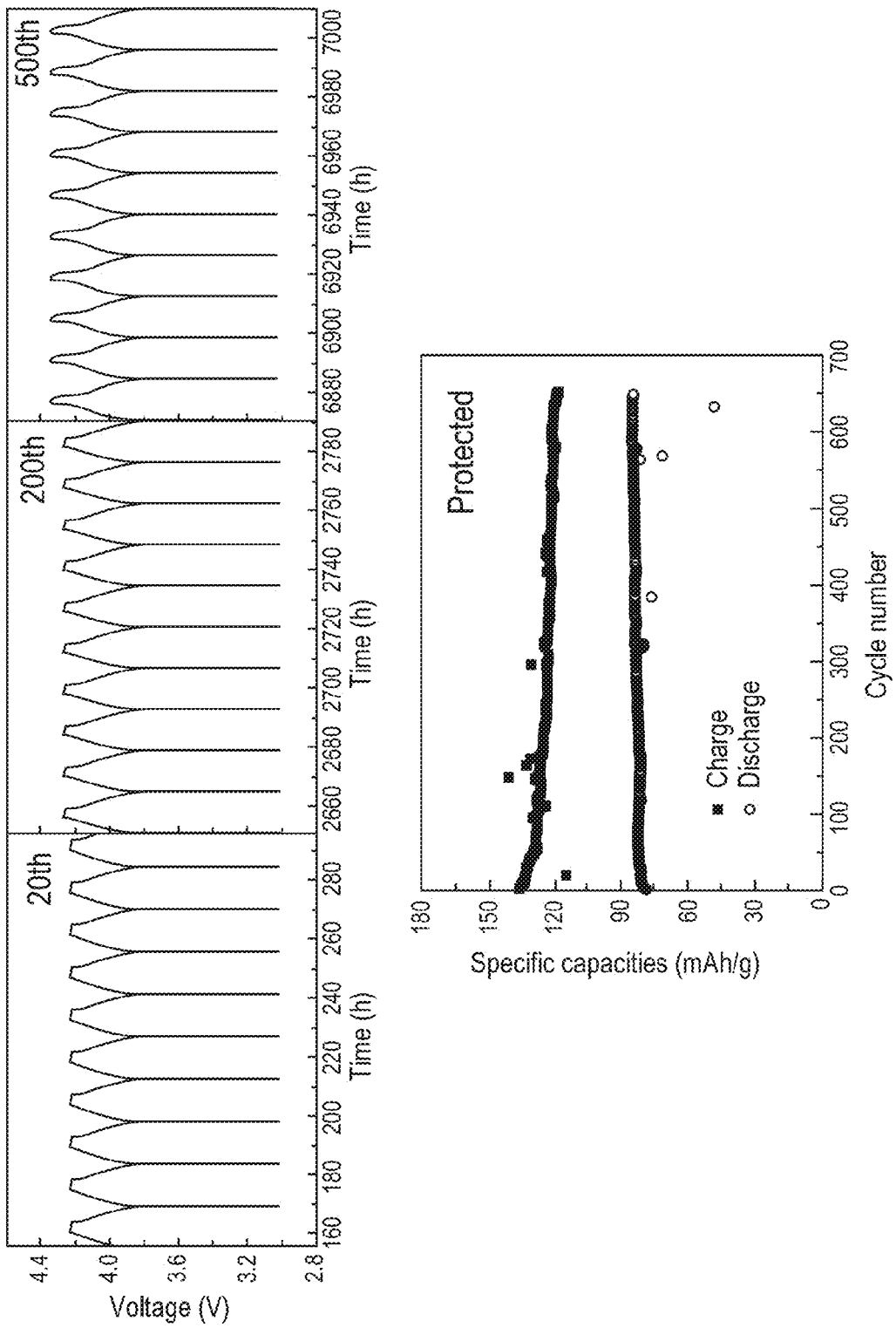
FIG. 14 illustrates a PFO composite/P3BT composite bilayer separator in a Li-ion cell along with cycling data. Improved protection in Li$_{1.05}$Mn$_{1.95}$O$_4$ cell.

FIG. 14 illustrates a PFO/glass fiber composite and P3BT/glass fiber composite bilayer separator in a Li-ion $Li_{1.05}Mn_{1.95}O_4$ cell along with cycling data. Improved protection in the $Li_{1.05}Mn_{1.95}O_4$ cell cycled at C/6 rate and 50% overcharge. The upper cell voltage increased from 4.25 to 4.35 V during the first 500 cycles. Stable discharge capacity for over 650 overcharged cycles so far.

Figure 15:
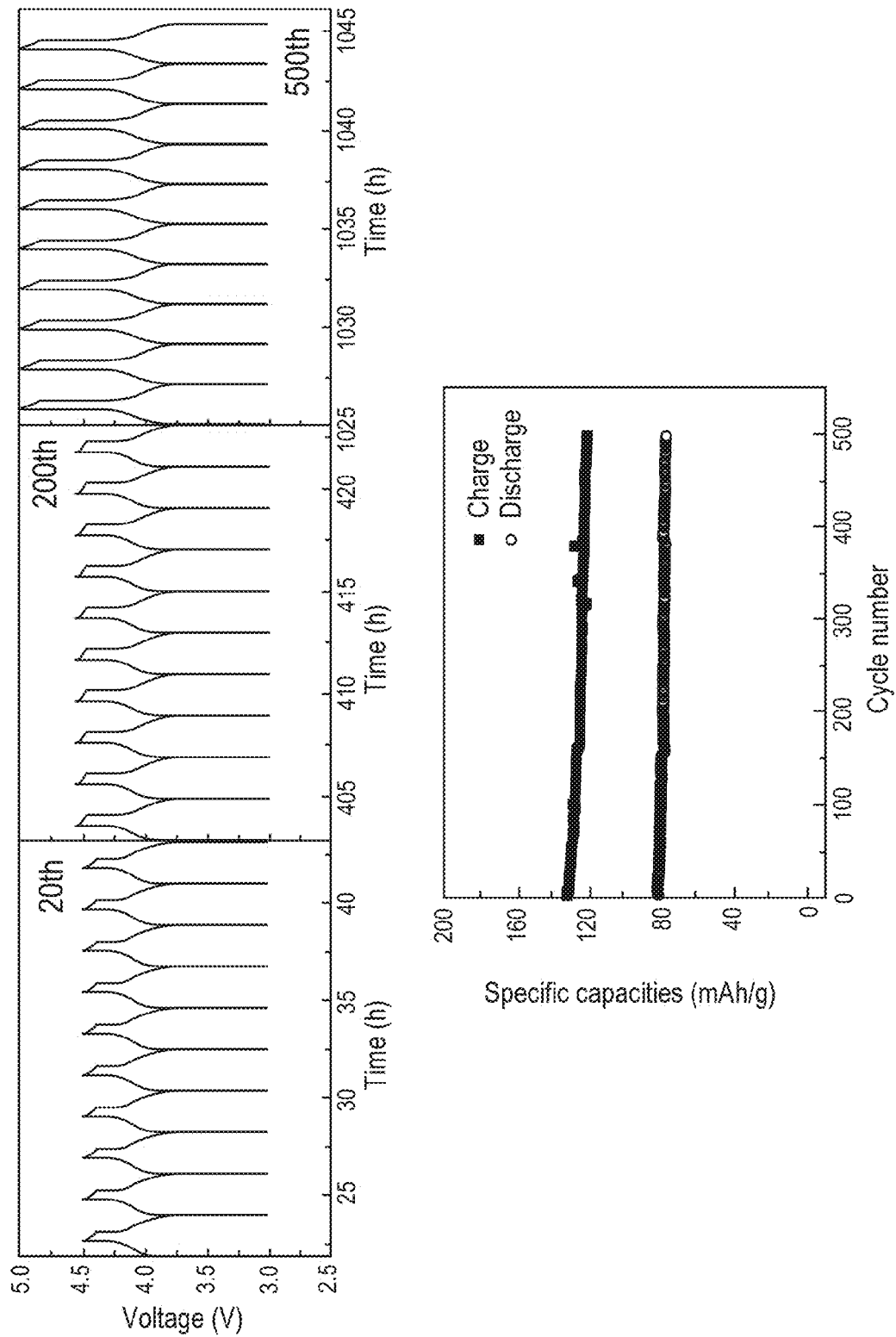
FIG. 15 illustrates a PFO composite/P3BT composite bilayer separator in a Li-ion cell along with cycling data. Improved protection in Li$_{1.05}$Mn$_{1.95}$O$_4$ cell cycled at C rate and 60% overcharge.

FIG. 15 illustrates a PFO/glass fiber composite and P3BT/glass fiber composite bilayer separator in a Li-ion $Li_{1.05}Mn_{1.95}O_4$ cell along with cycling data. The $Li_{1.05}Mn_{1.95}O_4$ cell cycled at C rate and 60% overcharge. Improved rate capability compared to the previous microporous composites. Upper cell voltage limited at about 4.5 V for more than 300 cycles. High-rate overcharge protection maintained for more than 500 cycles.

Figure 16:
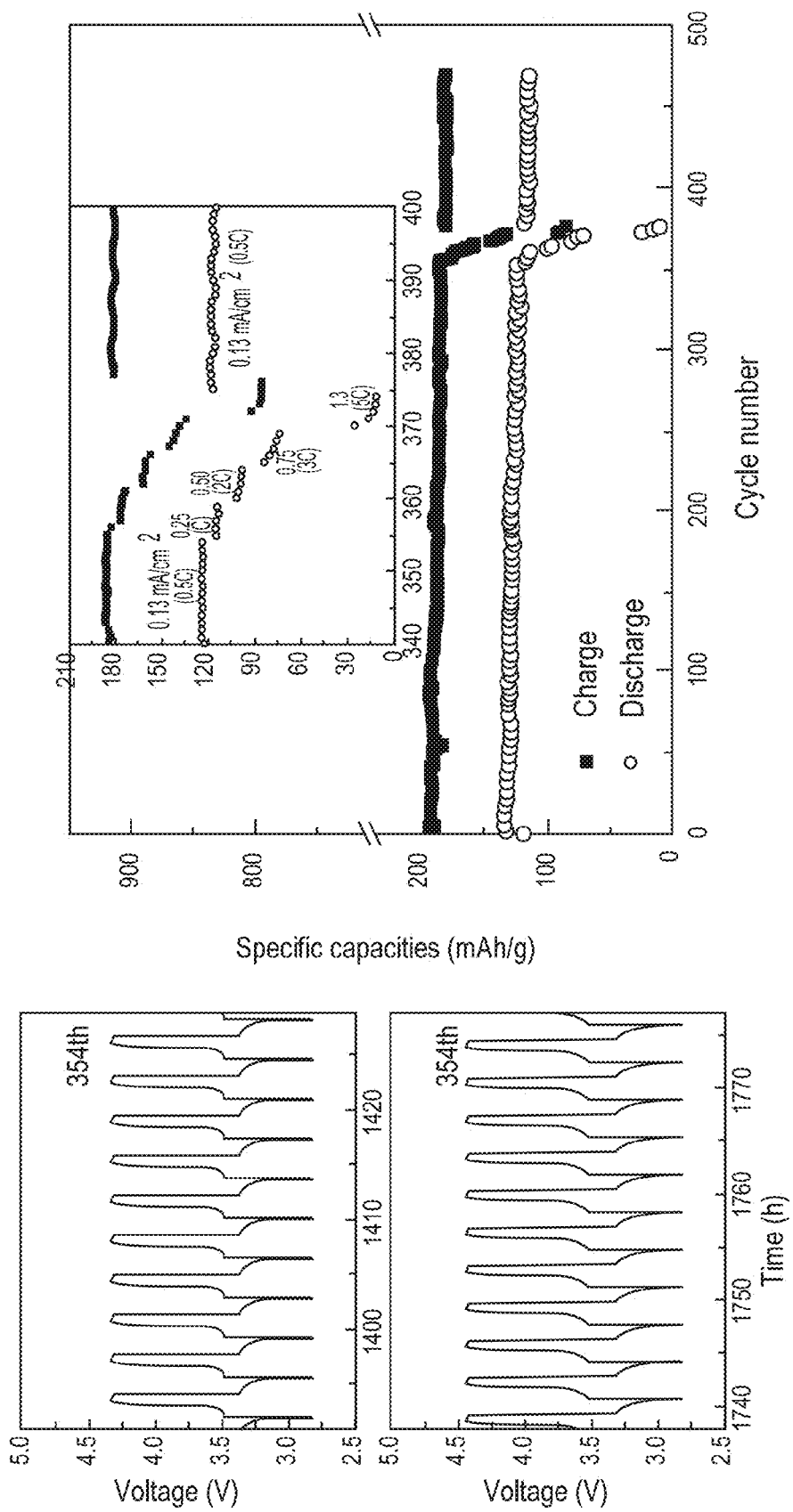
FIG. 16 illustrates a PFO and glass fiber composite/P3BT and glass fiber composite bilayer separator in a Li-ion LiFePO$_4$ cell along with cycling data.

FIG. 16 illustrates PFO/glass fiber composite and P3BT/glass fiber composite bilayer separator in a Li-ion $LiFePO_4$ cell along with cycling data. Upper limiting voltage at 4.35 V when cycling the $LiFePO_4$ cell at 0.5C and 50% overcharge. 95% capacity retention after the first 350 overcharge cycles at 0.5C. Maintained for more than 470 overcharged cycles.

Figure 17:
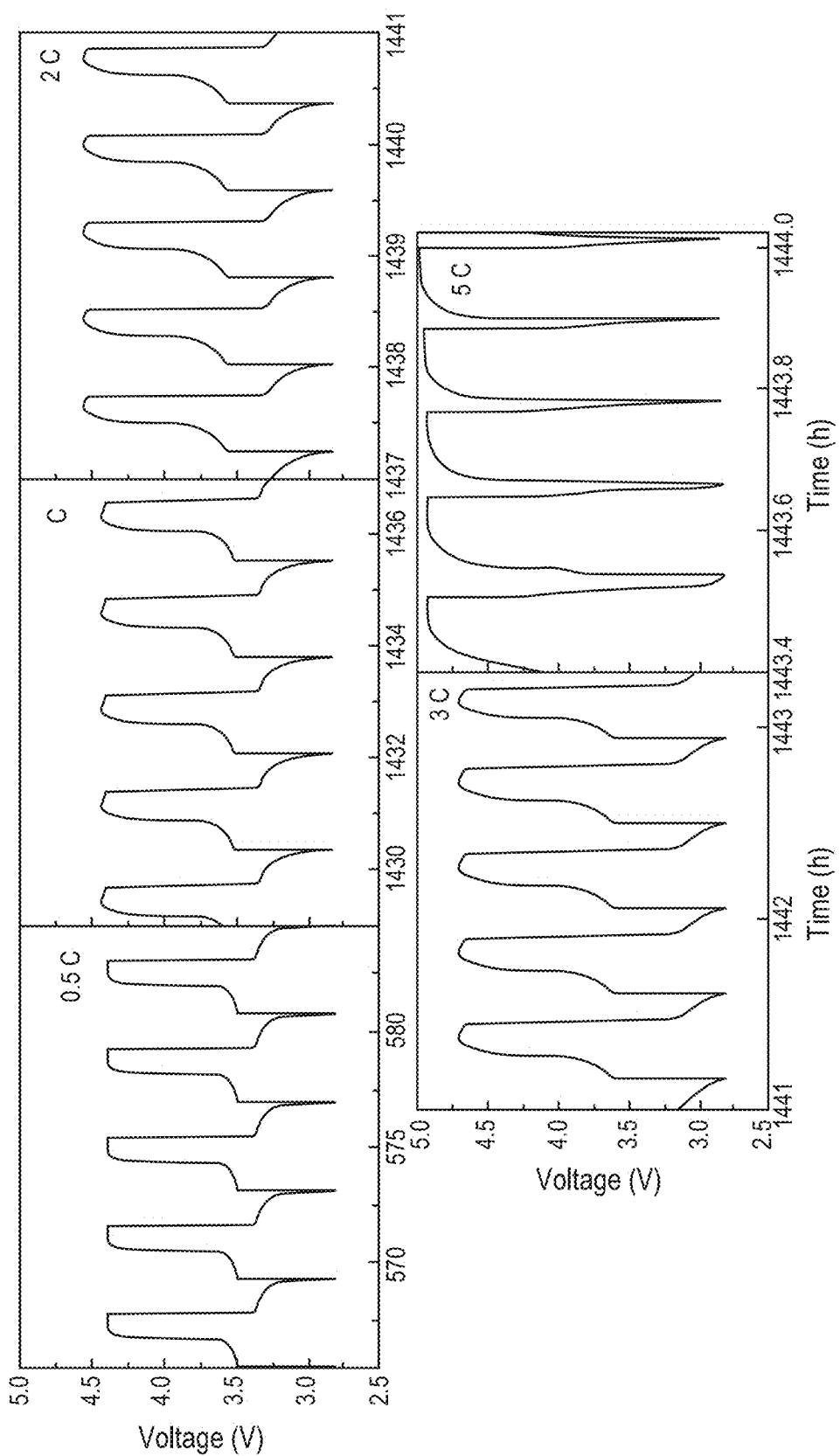
FIG. 17 illustrates a PFO and glass fiber composite/P3BT and glass fiber composite bilayer separator in a Li-ion LiFePO$_4$ cell along with cycling data. Increased upper limiting voltage at higher cycling rates. Protection was effective even at 5C charging rate.

FIG. 17 illustrates PFO/glass fiber composite and P3BT/glass fiber composite bilayer separator in a Li-ion $LiFePO_4$ cell along with cycling data. Increased upper limiting voltage at higher cycling rates. Protection was effective even at 5C charging rate.

Electroactive Fibers Synthesized by Electrospinning

Figure 18:
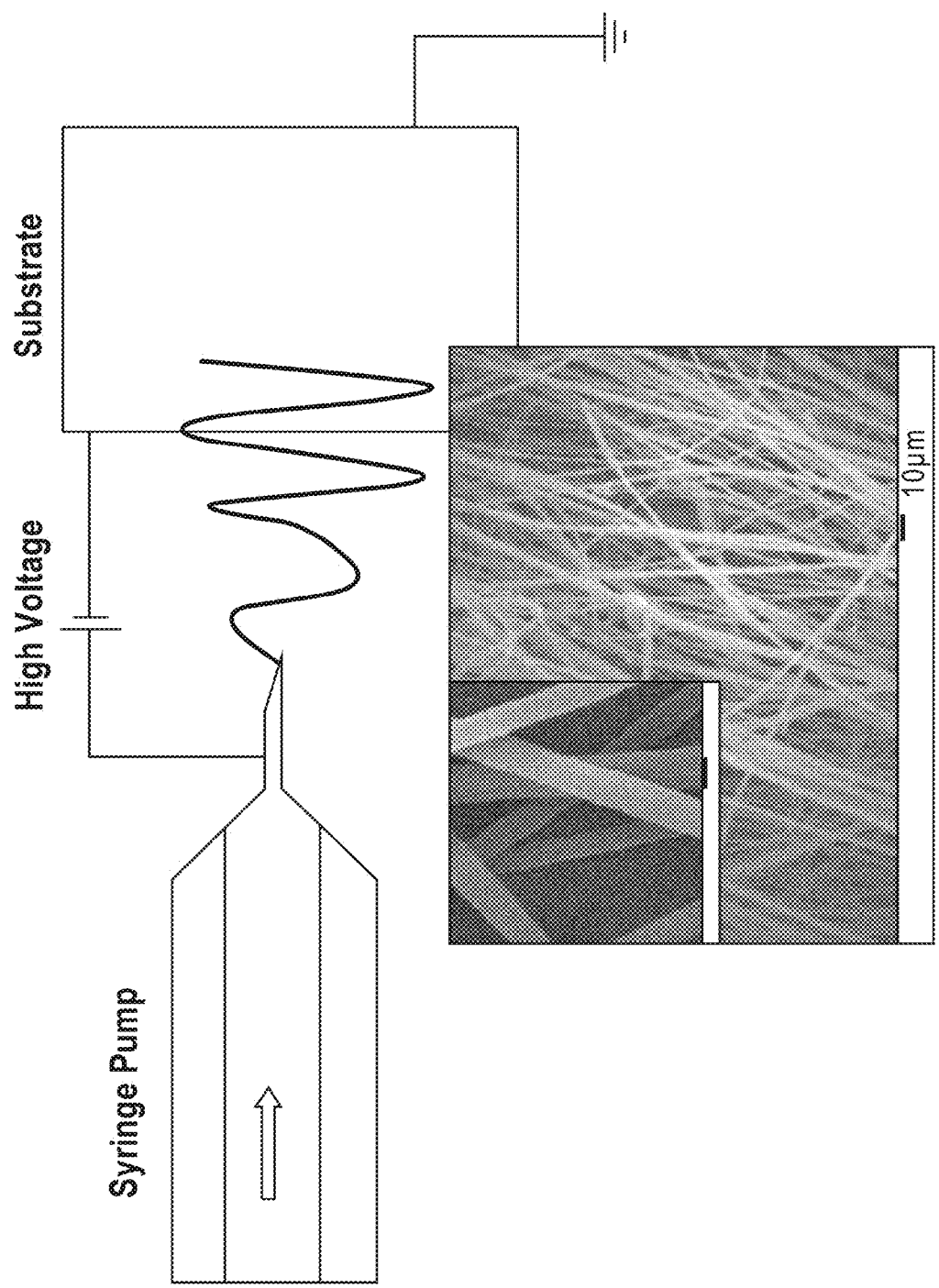
FIG. 18 illustrates an apparatus used for synthesizing electroactive fibers.

FIG. 18 illustrates an apparatus used for synthesizing electroactive fibers. Electrospinning is used to make composite fiber membranes. An electrospinning technique was used to prepare a range of electroactive fibers and fiber composites. An aqueous or non-aqueous solution containing a mixture of the matrix phase and an electroactive polymer is used to create continuous polymer filaments that are deposited onto a substrate as a web. The substrate may be directly used as the current collector in the battery cells. A porous structure results from solvent evaporation that is beneficial for electrolyte absorption and wettability in the fiber composites.

Figure 19:
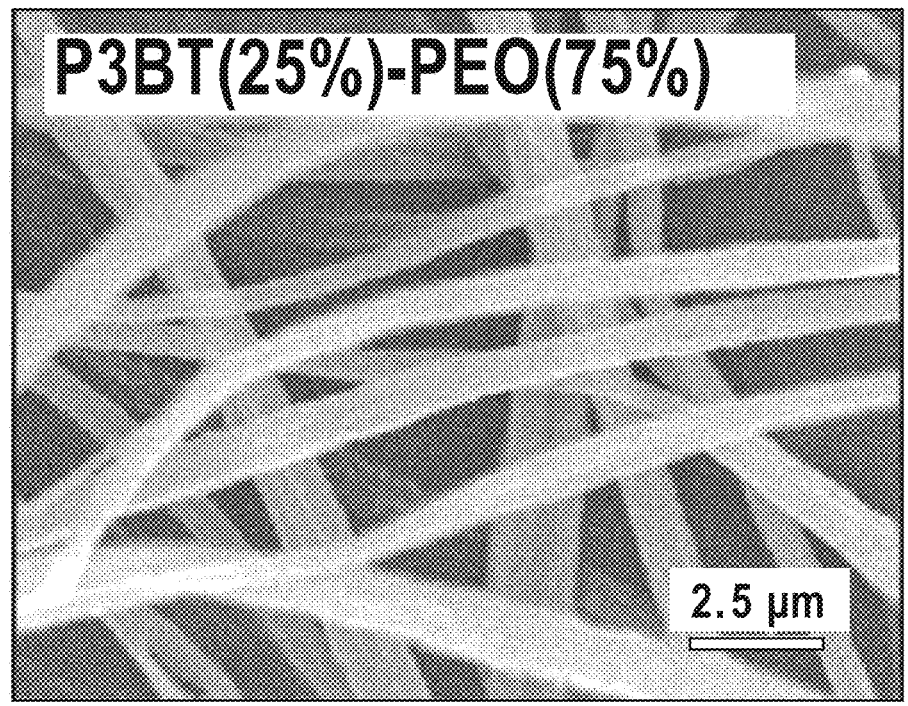
FIG. 19 illustrates a SEM of a mixture of the polyethylene oxide (PEO) matrix phase fibers and P3BT electroactive polymer fibers.
Figure 19:
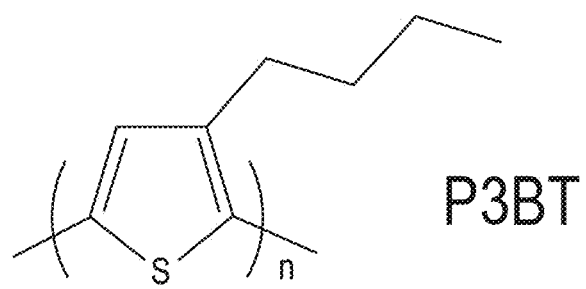
Figure 19:

FIG. 19 illustrates a SEM of a mixture of 75% of the polyethylene oxide (PEO) matrix phase fibers and 25% of the P3BT electroactive polymer fibers. The polymers are well mixed at the individual fiber level. The electrospinning process demonstrates an improved utilization of electroactive polymer material and a reduced cost for overcharge protection.

Figure 20:
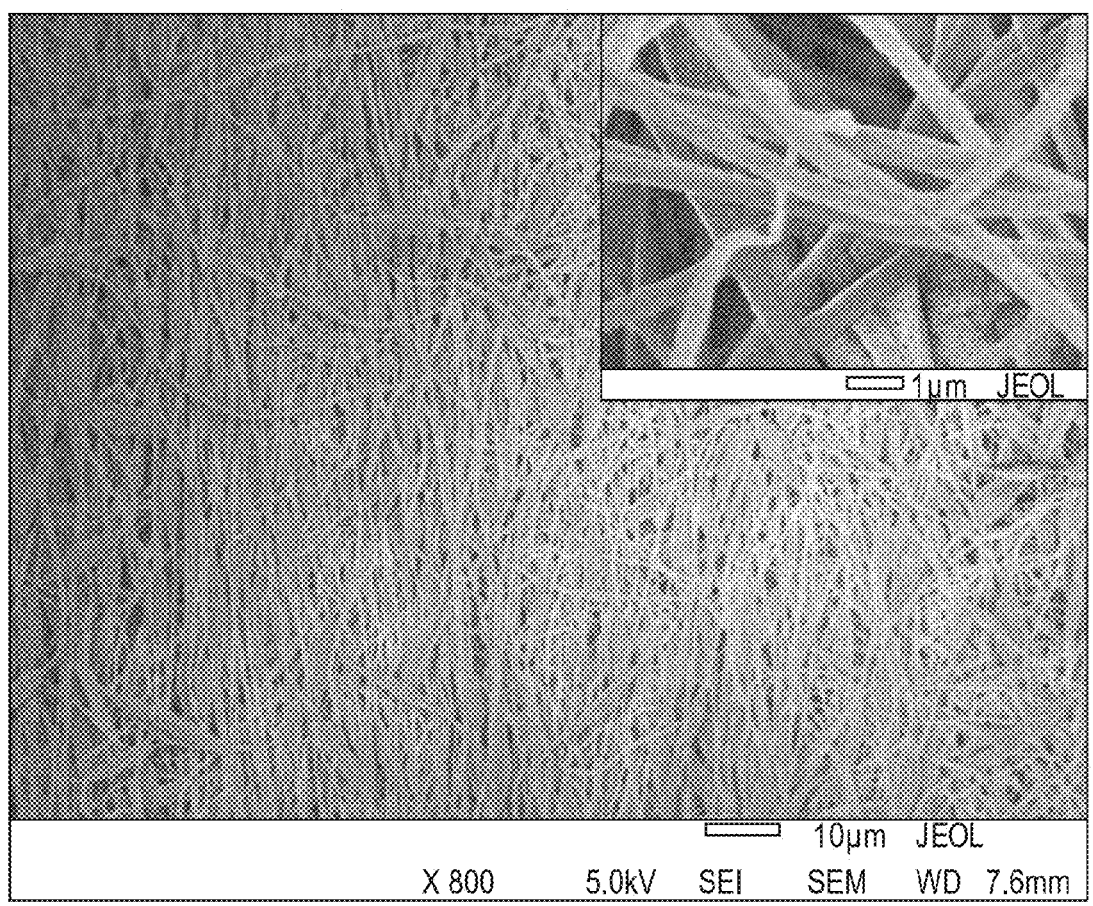
FIG. 20 illustrates a SEM of a mixture of 75% of the polyethylene oxide (PEO) matrix phase fibers and 25% of the PFO electroactive polymer fibers.

FIG. 20 illustrates a SEM of a mixture of 75% of the polyethylene oxide (PEO) matrix phase fibers and 25% of the PFO electroactive polymer fibers. The electrospinning process demonstrates that dense electroactive-fiber membranes can be made in varying compositions and film thicknesses. The electrospinning process provides an elegant, scalable, and cost-effective way to produce lithium-ion battery separators capable of voltage-regulated shunting.

Figure 21:
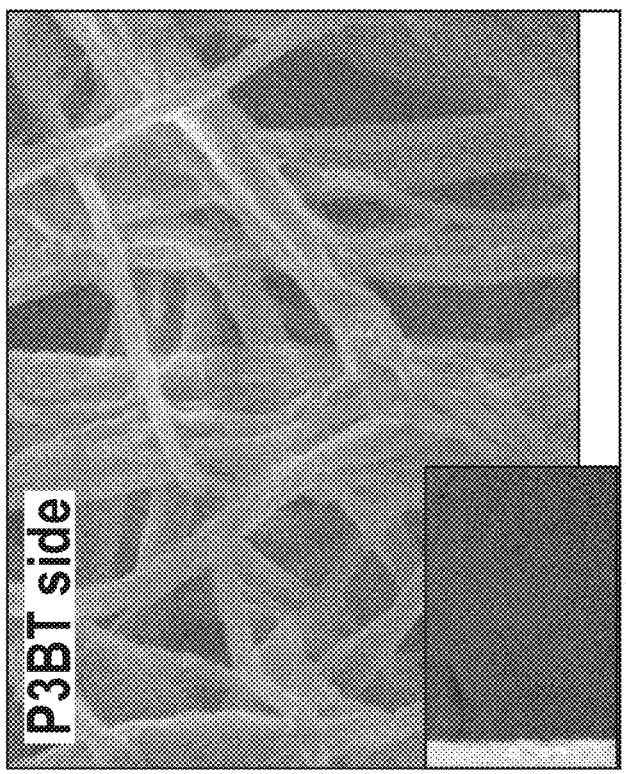
FIG. 21 illustrates dense bilyer electroactive-fiber composite membranes. The SEM photos illustrate dense bilayer electroactive-fiber membranes made by direct deposition of the second polymer fibers on top of the first polymer fibers.
Figure 21:
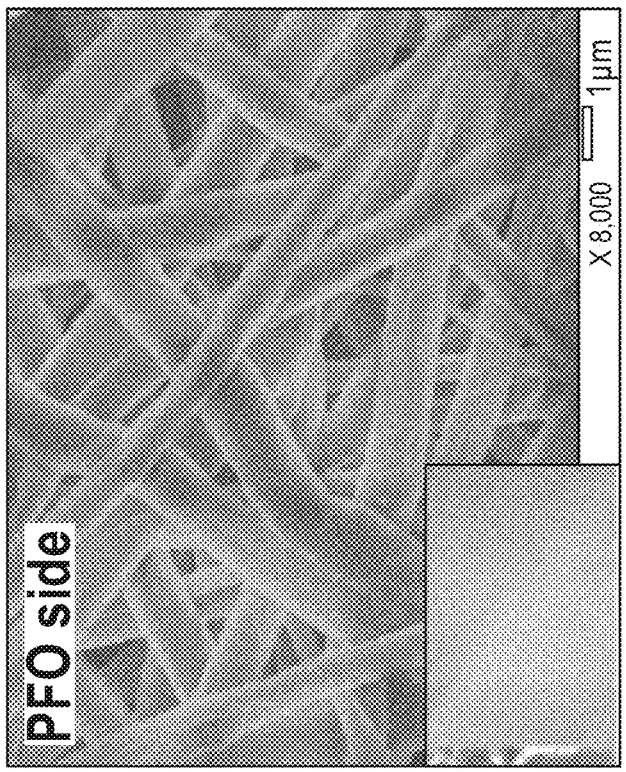

FIG. 21 illustrates dense bilyer electroactive-fiber composite membranes. The SEM photos illustrate dense bilayer electroactive-fiber membranes made by direct deposition of the second polymer fibers on top of the first polymer fibers. The SEM on the left illustrates a view of the PFO side while the SEM on the right illustrates a view of the P3BT side. Expansion of a voltage window occurs by placing the high-voltage polymer PFO next to the cathode to set the protection potential and the lower-voltage polymer P3BT next to the anode to complete the reversible shunt and protect the high-voltage polymer PFO from degradation at the anode potential.

Figure 22:
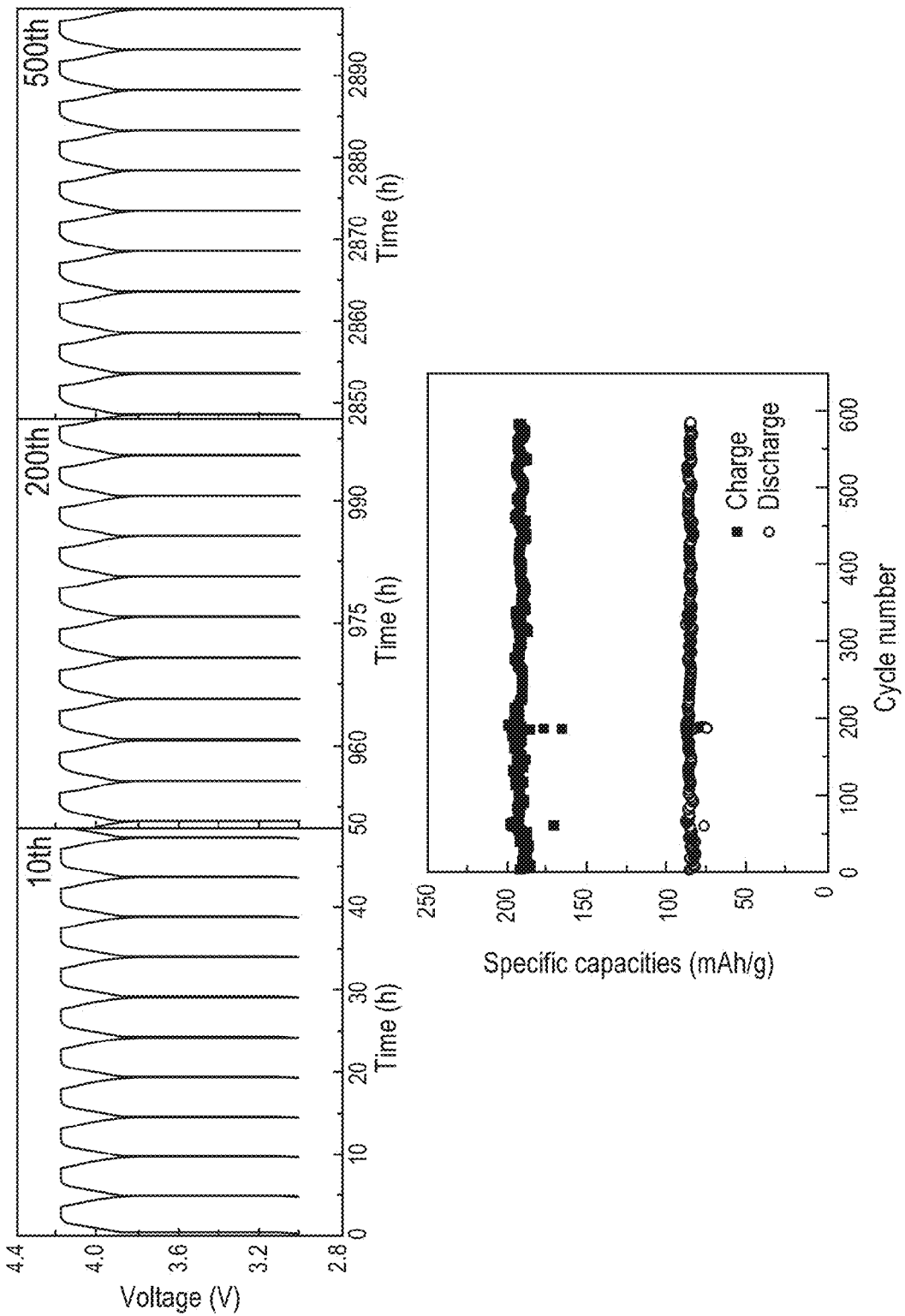
FIG. 22 illustrates the improved performance in electro-active-fiber composite membranes in a Li$_{1.05}$Mn$_{1.95}$O$_4$ cell.

FIG. 22 illustrates the improved performance in electroactive-fiber composite membranes in a $Li_{1.05}Mn_{1.95}O_4$ cell. The $Li_{1.05}Mn_{1.95}O_4$ cell is protected by a PFO/P3BT bilayer fiber composite. The cell was cycled at C/2 rate and 125% overcharge. The cycling results indicate improved polymer utilization and lowered internal resistance. The cycling results also indicate a stable high-rate overcharge protection at 4.2 V for over 600 cycles so far.

Figure 23:
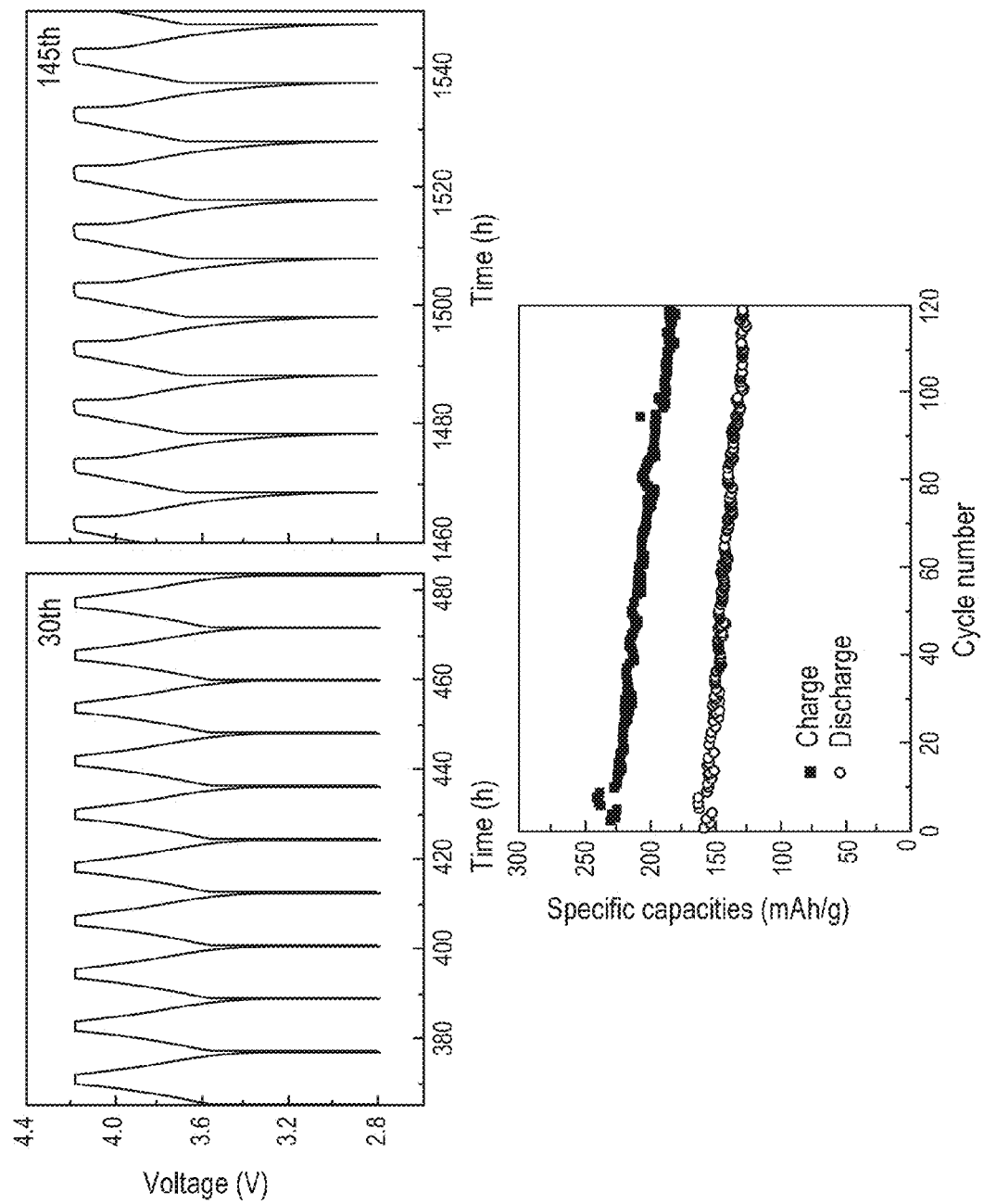
FIG. 23 illustrates the improved performance in electro-active-fiber composite membranes in a LiNi$_{0.8}$Co$_{0.15}$Al$_{0.05}$O$_2$ cell.

FIG. 23 illustrates the improved performance in electroactive-fiber composite membranes in a $LiNi_{0.8}Co_{0.15}Al_{0.05}O_2$ cell. The $LiNi_{0.8}Co_{0.15}Al_{0.05}O_2$ cell (Gen 2) is protected by a PFO/P3BT bilayer fiber composite. The cell was cycled at C/5 rate and 50% overcharge. The cycling results indicate an upper limiting voltage constant at 4.2 V, suggesting improved protection. The decrease in discharge capacity is likely due to the instability of $LiNi_{0.8}Co_{0.15}Al_{0.05}O_2$ cell Gen 2.

Figure 24:
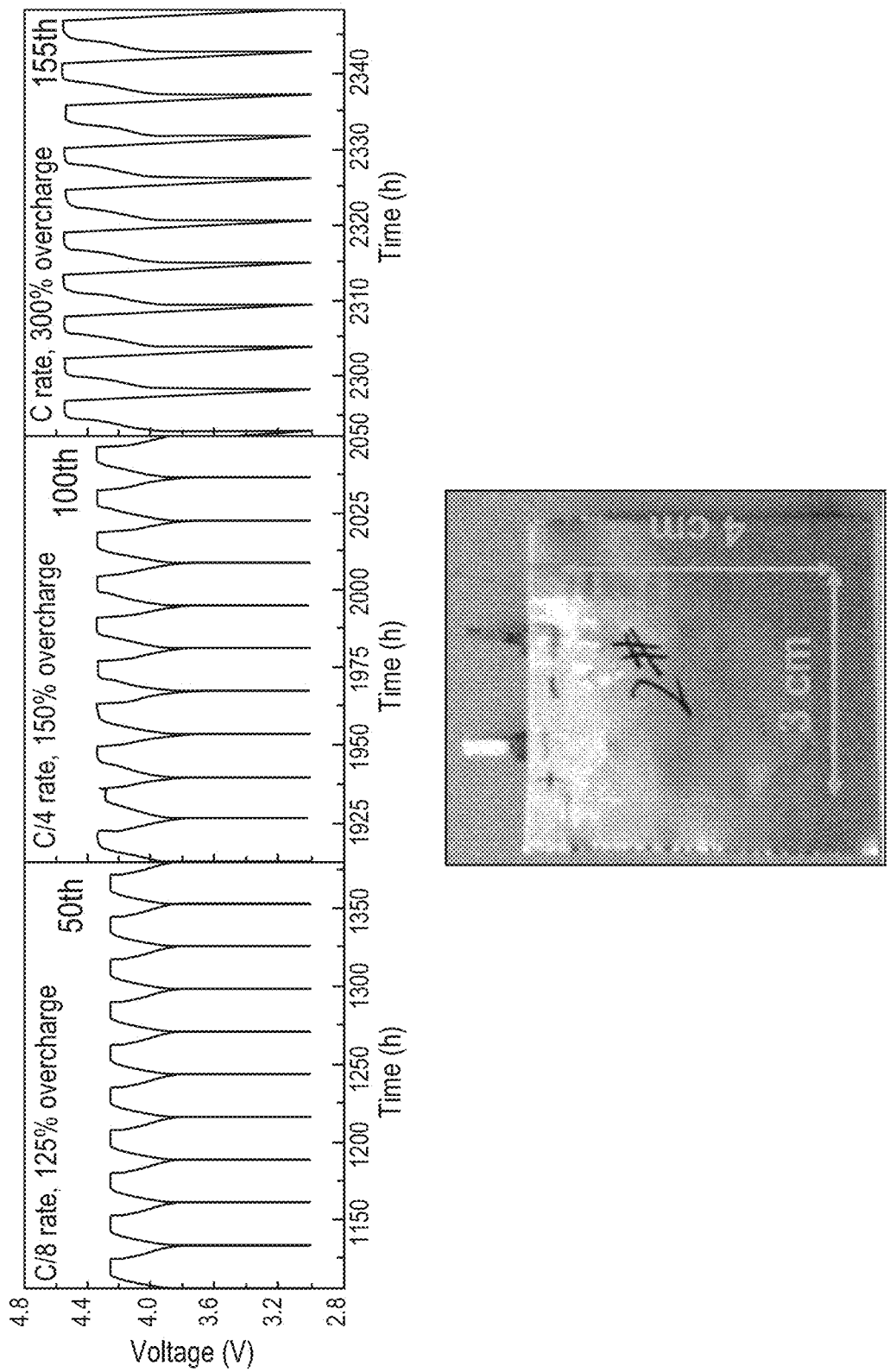
FIG. 24 illustrates further improved performance in electroactive-fiber composite membranes in a Li$_{1.05}$Mn$_{1.95}$O$_4$ cell and the feasibility in scale-up.

FIG. 24 illustrates further improved performance in electroactive-fiber composite membranes in a $Li_{1.05}Mn_{1.95}O_4$ cell and the feasibility in scale-up. As illustrated, a larger-sized $Li_{1.05}Mn_{1.95}O_4$ pouch cell is protected by the PFO/P3BT glass fiber composite. The cycling results indicate that the holding voltage increased with the current density. The cycling results also indicate a stable protection was achieved at all rates tested.

This invention has been described herein to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A porous composite fiber membrane comprising poly [(9,9-dioctylfluorenyl-2,7-diyl)] (PFO) fibers and poly(3-butylthiophene) (P3BT) fibers.

* * * * *